United States Patent
Åström et al.

(10) Patent No.: US 10,484,955 B2
(45) Date of Patent: Nov. 19, 2019

(54) BEAM FORMING FOR SYNCHRONIZATION SIGNALS

(71) Applicant: Telefonaktiebolaget LM Ericsson (publ), Stockholm (SE)

(72) Inventors: Magnus Åström, Lund (SE); Andres Reial, Malmö (SE); Henrik Sahlin, Mölnlycke (SE); Sven Petersson, Sävedalen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 58 days.

(21) Appl. No.: 15/569,226

(22) PCT Filed: Oct. 12, 2017

(86) PCT No.: PCT/EP2017/076077
§ 371 (c)(1),
(2) Date: Oct. 25, 2017

(87) PCT Pub. No.: WO2019/072392
PCT Pub. Date: Apr. 18, 2019

(65) Prior Publication Data
US 2019/0116564 A1   Apr. 18, 2019

(51) Int. Cl.
*H04W 28/04* (2009.01)
*H04W 56/00* (2009.01)
(Continued)

(52) U.S. Cl.
CPC ........ *H04W 56/001* (2013.01); *H04B 7/0608* (2013.01); *H04B 7/0617* (2013.01);
(Continued)

(58) Field of Classification Search
CPC ..... H04W 56/001; H04B 7/0617; H04B 7/10; H04L 27/2636
(Continued)

(56) References Cited

U.S. PATENT DOCUMENTS

2007/0278068 A1* 12/2007 Wallace ............ G01M 13/023
                                                  198/810.02
2011/0032149 A1*  2/2011 Leabman ............. H01Q 1/246
                                                  342/368
(Continued)

FOREIGN PATENT DOCUMENTS

EP    2833662 A1   2/2015
EP    3174348 A1   5/2017
(Continued)

*Primary Examiner* — Sai Ming Chang
(74) *Attorney, Agent, or Firm* — Murphy, Bilak & Homiller, PLLC

(57) ABSTRACT

A method is disclosed for a network node configured to transmit wireless communication signals using beam forming and configured to apply any of one or more data carrying beam widths for transmission of data carrying signals dedicated to a specific wireless communication device.

The method comprises determining one or more requirement parameters for transmission of synchronization signals, wherein the one or more requirement parameters comprise a desired synchronization signal beam width and a minimum effective power, and wherein the determined desired synchronization signal beam width is larger than a minimum one of the data carrying beam widths.

The method also comprises calculating beam forming weights based on the one or more requirement parameters, wherein a beam resulting from the calculated beam forming weights has a beam width larger than, or equal to, the determined desired synchronization signal beam width and an effective power larger than, or equal to, the minimum effective power, and wherein the calculation is performed by assigning non-zero value to a number of beam forming weights which exceeds a minimum number of beam forming weights for the determined desired synchronization signal beam width.

(Continued)

The method further comprises generating a synchronization signal for transmission and transmitting the generated synchronization signal using the calculated beam forming weights.

Corresponding arrangement, network node and computer program product are also disclosed.

16 Claims, 3 Drawing Sheets

(51) Int. Cl.
 H04B 7/06 (2006.01)
 H04B 7/10 (2017.01)
 H04L 27/26 (2006.01)
 H04B 7/0456 (2017.01)

(52) U.S. Cl.
 CPC ............ *H04B 7/0695* (2013.01); *H04B 7/10* (2013.01); *H04L 27/2636* (2013.01); *H04B 7/0456* (2013.01); *H04B 7/0691* (2013.01)

(58) Field of Classification Search
 USPC .......................................................... 370/329
 See application file for complete search history.

(56) References Cited

U.S. PATENT DOCUMENTS

| | | | |
|---|---|---|---|
| 2016/0212631 A1* | 7/2016 | Shen ................... | H04W 56/001 |
| 2017/0353290 A1* | 12/2017 | Abedini ................ | H04L 7/0016 |
| 2018/0115996 A1* | 4/2018 | Si ....................... | H04W 74/0816 |
| 2018/0176065 A1* | 6/2018 | Deng ................... | H04B 7/0695 |
| 2018/0338321 A1* | 11/2018 | Shepard ............... | H04B 7/0452 |

FOREIGN PATENT DOCUMENTS

| | | |
|---|---|---|
| WO | 2016141961 A1 | 9/2016 |
| WO | 2017131566 A1 | 8/2017 |

* cited by examiner

BEAM FORMING FOR SYNCHRONIZATION SIGNALS

TECHNICAL FIELD

The present disclosure relates generally to the field of wireless communication. More particularly, it relates to beam forming for synchronization signals to be transmitted by a network node of a wireless communication system.

BACKGROUND

Many wireless communication systems employ beam forming transmission for conveying data to one or more wireless communication devices (WCD:s). As is well known in the art, beam forming transmission has the advantage that the used transmission power may be distinctly directed towards the WCD that the transmission is intended for, which increases the range and/or decreases the required transmission power, as well as decreases interference experienced by other WCD:s.

In wireless communication systems employing beam forming transmission, signals intended for many or all WCD:s associated with a network node (e.g. broadcast signals, control signals, etc.) may typically be transmitted using omnidirectional transmission, wide beam transmission, or beam sweep transmission; all of which are also well known in the art. Synchronization signals is one example of such signals intended for more than one WCD.

Problems with the approaches using wide beam transmission or omnidirectional transmission include one or more of: implicit reduction of the available maximum transmission power, increased hardware cost, and increased power consumption.

Legacy solutions for synchronization signal transmission typically use single port transmission solutions resulting in a wide beam transmission. This is since, according to legacy solutions, typically only one (or a few) antennas are implemented per antenna port in the dimension (e.g. the horizontal dimension) that determines the critical beam width and a narrow beam typically requires many antennas.

In more recent approaches where antenna arrays comprising multiple antenna elements in each dimension are used, the legacy methods for synchronization signal transmission may still be used in principle (invoking a small subset of the antenna elements in each dimension to mimic the wide beam of a legacy solution).

However, invoking only a few antenna elements in each dimension to create a wide beam may cause a reduction in the available transmission power. This is due to that each antenna element typically has a maximum power amplifier output limitation. Thus, using fewer antenna elements leads to a relatively lower maximum transmission power.

On the other hand, implementing antenna array power amplifiers with higher maximum output power capabilities typically entails increased hardware cost and increased power consumption.

Another approach to implementing full power wide beam synchronization signal transmission in beam forming systems is to implement a separate antenna element for this purpose in addition to the antenna array used for beam forming of dedicated transmission. Such a solution also entails increased hardware cost as well as increased size of the antenna installation.

Problems with the approaches using beam sweep transmission include one or more of: decreased coverage in one or more dimensions and inefficient use of transmission resources (e.g. time/frequency).

A typical implementation for antenna arrays comprising multiple antenna elements includes use of fast Fourier transform (FFT) beam forming, wherein multiple narrow beams (width depending on the number of antenna elements invoked for each beam) are swept in time and/or frequency to reach the entire area to be covered by the synchronization signal.

However, in more recent approaches (e.g. for the new radio, NR, concept) the number of beams allowed to be used for broadcast signal distribution may be restricted (e.g. since the number of possible beams may be very large in some emerging approaches). Under such restrictions, the aggregated angular coverage of a limited set of narrow FFT beams will typically not cover a desired area to be covered. On the other hand, if the FFT beams are widened by modification techniques known in the art (e.g. filtering) to achieve appropriate angular coverage, the maximum transmission power available with decrease as explained above; resulting in decreased radial coverage.

Therefore, there is a need for alternative approaches to synchronization signal transmission in wireless communication systems applying beam forming.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above or other disadvantages.

According to a first aspect, this is achieved by a method for a network node configured to transmit wireless communication signals using beam forming and configured to apply any of one or more data carrying beam widths for transmission of data carrying signals dedicated to a specific wireless communication device.

The method comprises determining one or more requirement parameters for transmission of synchronization signals, wherein the one or more requirement parameters comprise a desired synchronization signal beam width and a minimum effective power, and wherein the determined desired synchronization signal beam width is larger than a minimum one of the data carrying beam widths.

The method also comprises calculating beam forming weights based on the one or more requirement parameters, wherein a beam resulting from the calculated beam forming weights has a beam width larger than, or equal to, the determined desired synchronization signal beam width and an effective power larger than, or equal to, the minimum effective power, and wherein the calculation is performed by assigning non-zero value to a number of beam forming weights which exceeds a minimum number of beam forming weights for the determined desired synchronization signal beam width.

The method further comprises generating a synchronization signal for transmission and transmitting the generated synchronization signal using the calculated beam forming weights.

In some embodiments, the determined desired synchronization signal beam width is smaller than an omnidirectional beam width.

In some embodiments, the one or more requirement parameters further comprise one or more of: a beam direction and a beam polarization.

In some embodiments, determining the one or more requirement parameters is performed based on a required coverage for the synchronization signals.

In some embodiments, at least one of the minimum effective power and the minimum number of beam forming weights is associated with a discrete Fourier transform beam having the determined desired synchronization signal beam width.

In some embodiments, the minimum effective power is larger than an effective power achieved by constructing the discrete Fourier transform beam having the determined desired synchronization signal beam width.

In some embodiments, the minimum number of beam forming weights is larger than a number of non-zero beam forming weights achieved by constructing the discrete Fourier transform beam having the determined desired synchronization signal beam width.

In some embodiments, calculating the beam forming weights comprises applying an iterative algorithm, wherein the discrete Fourier transform beam having the determined desired synchronization signal beam width is used as an input value, and wherein each iteration increases the number of non-zero beam forming weights.

In some embodiments, the one or more requirement parameters further comprise a number of beams to be swept, wherein calculating beam forming weights comprises calculating beam forming weights for each of the beams to be swept, wherein generating the synchronization signal comprises adapting, based on a sweeping pattern, the synchronization signal for the beams to be swept, and wherein transmitting the generated synchronization signal comprises transmitting the adapted synchronization signal by sweeping the beams.

In some embodiments, the sweeping of the beams is in at least one of: a time dimension and a frequency dimension.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an arrangement for a network node configured to transmit wireless communication signals using beam forming and configured to apply any of one or more data carrying beam widths for transmission of data carrying signals dedicated to a specific wireless communication device.

The arrangement comprises a controller configured to cause determination of one or more requirement parameters for transmission of synchronization signals, wherein the one or more requirement parameters comprise a desired synchronization signal beam width and a minimum effective power, and wherein the determined desired synchronization signal beam width is larger than a minimum one of the data carrying beam widths.

The controller is also configured to cause calculation of beam forming weights based on the one or more requirement parameters, wherein a beam resulting from the calculated beam forming weights has a beam width larger than, or equal to, the determined desired synchronization signal beam width and an effective power larger than, or equal to, the minimum effective power, and wherein the calculation is performed by assigning non-zero value to a number of beam forming weights which exceeds a minimum number of beam forming weights for the determined desired synchronization signal beam width.

The controller is further configured to cause generation of a synchronization signal for transmission, and transmission of the generated synchronization signal using the calculated beam forming weights.

A fourth aspect is a network node comprising the arrangement of the third aspect.

In some embodiments, any of the above aspects may additionally have features identical with or corresponding to any of the various features as explained above for any of the other aspects.

An advantage of some embodiments is that an alternative approach to synchronization signal transmission in wireless communication systems applying beam forming is provided.

Another advantage of some embodiments is that less reduction of the available maximum transmission power is experienced compared to solutions of the prior art. In some cases there may be no reduction of the available maximum transmission power compared to narrow beam transmission.

Yet an advantage of some embodiments is that the hardware cost is not increased (or only marginally increased) by implementation of the approaches to systems configured for narrow beam transmission.

Yet another advantage of some embodiments is that the hardware power consumption is not increased (or only marginally increased) by implementation of the approaches to systems configured for narrow beam transmission.

A further advantage of some embodiments is that desired coverage may be achieved.

Another further advantage of some embodiments is that efficient use of transmission resources may be achieved.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where synchronization signal transmission in wireless communication systems applying beam forming is enabled. Some embodiments enable transmission of synchronization signals using a relatively wide beam (e.g. having a beam width that is larger than a minimum beam width used for data transmission) without a corresponding decrease in maximum available transmission power.

According to some embodiments, the approach may be seen as setting a minimum power level for a desired beam (implying that the maximum available transmission power must be at least equal to this minimum power level) or setting a minimum number of antenna elements to be utilized for a desired beam width, and defining the synchronization signal transmission to fulfil or exceed the minimum power level or the minimum number of antenna elements.

Figure 1:
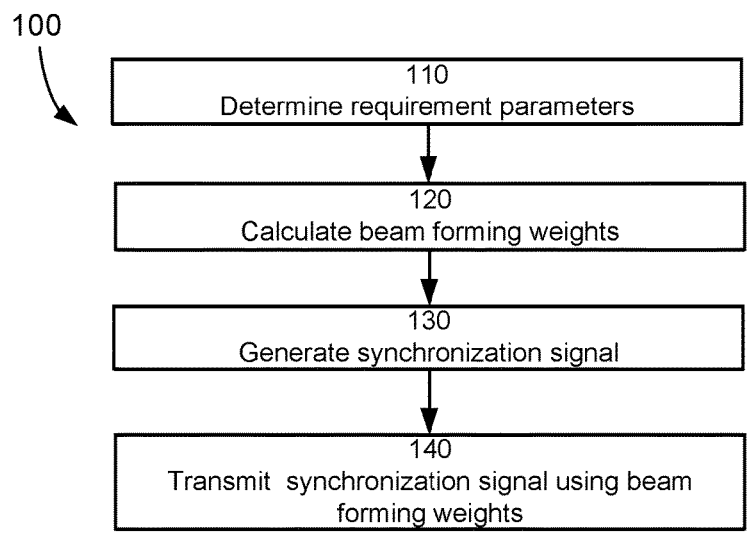
FIG. 1 is a flowchart illustrating example method steps according to some embodiments.

FIG. 1 illustrates an example method 100 according to some embodiments. The method may be performed in a network node configured to transmit wireless communication signals using beam forming and configured to apply any of one or more data carrying beam widths for transmission of data carrying signals dedicated to a specific wireless communication device.

That the network node is configured to apply any of one or more data carrying beam widths for transmission of data carrying signals dedicated to a specific wireless communication device is not by any means meant to exclude transmission of data also to other wireless communication devices than the specific wireless communication device, in the same or a different transmission action, using the same or a different one of the data carrying beam widths, etc.

In step 110, one or more requirement parameters are determined for transmission of synchronization signals. The one or more requirement parameters comprise a desired synchronization signal beam width and a minimum effective power, wherein the determined desired synchronization signal beam width is larger than a minimum one of the data carrying beam widths.

Typically, the one or more requirement parameters may be determined based on a required coverage for the synchronization signals (e.g. the geographical region to be covered and the received signal energy to be provided at the edges of the coverage area). For example, a certain radial coverage implies the minimum effective power when the beam pattern is known.

In some embodiments, the determined desired synchronization signal beam width may be smaller than an omni-directional beam width.

Generally when referred to herein, beam width may be defined in one or two (or possibly more) dimensions, as applicable. For example, when two dimensions are applied, a first angular value may define the beam width in a horizontal dimension (or an azimuth dimension) and a second angular value may define the beam width in a vertical dimension (or an elevational dimension). When more than one dimension is applied, the beam width may be the same or different in different dimensions.

The effective power may, for example, be expressed in terms of the actual transmitted power or in terms of equivalent isotropic radiated power (EIRP), i.e. the transmitted power multiplied by the antenna gain. The latter metric may be particularly appropriate when an active antenna array with distributed power amplifiers is used and the transmitted power is proportional to the utilized array size.

In some embodiments, the one or more requirement parameters may further comprise a beam direction and/or a beam polarization. In some embodiments, e.g. when polarization is different in different directions, requiring a specific polarization (i.e. the requirement parameters comprising a beam polarization) may not be particularly applicable. In other embodiments, e.g. when it is specified that two ports with orthogonal polarization are used, requiring a specific polarization (i.e. the requirement parameters comprising a beam polarization) may be applicable.

In step 120, beam forming weights are calculated based on the one or more requirement parameters. Prerequisites for this calculation are that a beam resulting from the calculated beam forming weights has a beam width larger than, or equal to, the determined desired synchronization signal beam width and an effective power larger than, or equal to, the minimum effective power.

Thus, the beam forming weights calculated in step 120 should produce a beam which has at least the determined desired synchronization signal beam width. Furthermore, the beam forming weights calculated in step 120 should produce a beam which can be transmitted using at least the minimum effective power.

The calculation is performed by assigning non-zero value to a number of beam forming weights which exceeds a minimum number of beam forming weights for the determined desired synchronization signal beam width.

Put differently, if a minimum number of non-zero beam forming weights is needed to produce a beam having the determined desired synchronization signal beam width, then the number of non-zero beam forming weights calculated in step 120 is higher.

According to some embodiments, another way of expressing this would be that, according to step 120, more antenna elements are used in the antenna set than is conventionally used to produce a beam having the determined desired synchronization signal beam width, e.g. using DFT precoding for beam forming. For example, a maximum number of weights (or a maximum array size) may be used according to some embodiments.

A synchronization signal for transmission is generated in step 130 and the generated synchronization signal is transmitted using the calculated beam forming weights in step 140. It should be noted that the beam may also be manipulated to point in a particular direction by application of any suitable known or future method, e.g. by applying suitable phase difference components between adjacent antenna elements.

An example synchronization signal may be a synchronization signal block (SSB) including primary synchronization signals (PSS), secondary synchronization signals (SSS) and physical broadcast channel (PBCH).

According to some beam sweeping embodiments, the one or more requirement parameters determined in step 110 further comprise a number of beams to be swept. Then, step 120 comprises calculating beam forming weights for each of the beams to be swept and step 140 comprises transmitting the adapted synchronization signal by sweeping the beams according to a sweeping pattern.

Generally, the sweeping of the beams may be in one or more of a time dimension and a frequency dimension. Furthermore, different beams may have the same or different requirement parameters (e.g. the same or different desired synchronization signal beam width).

In beam sweeping embodiments, step 130 typically also includes adapting the synchronization signal for the beams to be swept based on the sweeping pattern. For example, if the beam sweeping pattern is defined via a plurality of beams to be transmitted at different respective time delays in relation to some reference time, the adaptation may comprise adjusting, in the synchronization signal, a timing indication associated with the reference time based on the different respective time delays. In a typical example, primary synchronization signals (PSS) and secondary synchronization signals (SSS) are unchanged whereas physical broadcast channel (PBCH) is changed in the adaptation, and cyclic redundancy check CRC may also change accordingly.

In some embodiments, the number of beams to be swept may be determined based on the standardization specification of the applicable radio access technology. For example, a maximum of 4-8 beams are permitted for synchronization signal distribution in the Third Generation Partnership Project (3GPP) deployments for New Radio (NR) below 6 GHz. The network node may be configured to transmit the maximum number of permitted synchronization signal beams and/or fewer than the maximum number of beams, e.g. a single cell-wide beam. In some embodiments, the number of beams may be dynamically changed based on network operation parameters, e.g. the number of wireless communication devices associated with the network node, traffic load, etc.

Modern cellular systems often use advanced antenna systems. The antenna configurations for transmitting signals from network nodes are typically regularly-spaced, uniform, linear (or planar) arrays where each array position may accommodate a single antenna element or two cross-polarized elements, e.g. in a +/−45 degree configuration. With such antenna arrays, signals may be transmitted in narrow beams to increase signals strength in some directions and/or to reduce interference in other directions. A well-known transmit beamforming approach for such regular arrays is to apply discrete Fourier transform (DFT) precoding over the antenna elements which generates beams with a useful beam width in the order of 100/N degrees in a certain dimension if the element separation is half the wavelength, where N is the number of antenna elements of the array in that dimension.

Some illustrative examples will now be given regarding how the calculation of step 120 may be implemented in relation to the requirement parameters determined in step 110. In these examples, application of discrete Fourier transform (DFT) precoding over antenna elements to produce beam forming weights for a particular determined desired synchronization signal beam width will be seen as a conventional approach to beam forming weight calculation, and the corresponding beam will be denoted discrete Fourier transform beam.

In some embodiments, at least one of the minimum effective power and the minimum number of beam forming weights is associated with a discrete Fourier transform beam having the determined desired synchronization signal beam width.

For example, the minimum effective power may be larger than an effective power achieved by constructing the discrete Fourier transform beam and/or the minimum number of beam forming weights (the minimum number of antenna elements to be applied in the resulting transmission) may be larger than a number of non-zero beam forming weights achieved by constructing the discrete Fourier transform beam.

Thus, the calculation in step 120 may use weights of the discrete Fourier transform beam having the determined desired synchronization signal beam width as an input value and aim at producing a beam with the same or larger beam width using more non-zero weights (more antenna elements) and thereby achieving a higher effective power.

Calculating the beam forming weights in step 120 may, for example, comprise applying an iterative algorithm (e.g. expansion of sub-arrays as will be explained in the following), wherein the discrete Fourier transform beam having the determined desired synchronization signal beam width is used as an input value, and wherein each iteration increases the number of non-zero beam forming weights and/or the available effective power.

Expansion of Subarrays

In a typical approach it may be desirable to achieve coverage (according to some parameter, e.g., reference signal received power—RSRP) with as few beams as possible for a given antenna configuration. By minimizing the number of beams, overhead is also minimized implying an increased system performance. It may be noted that several algorithms to design beams exist and are extensively described in the literature (e.g., fast Fourier transfer (FFT) beams, beams based on filter theory or windowing, construction of arbitrarily wide beams by (for example) Golay sequences as described further in WO 2016/141961 A1).

Figure 2A:
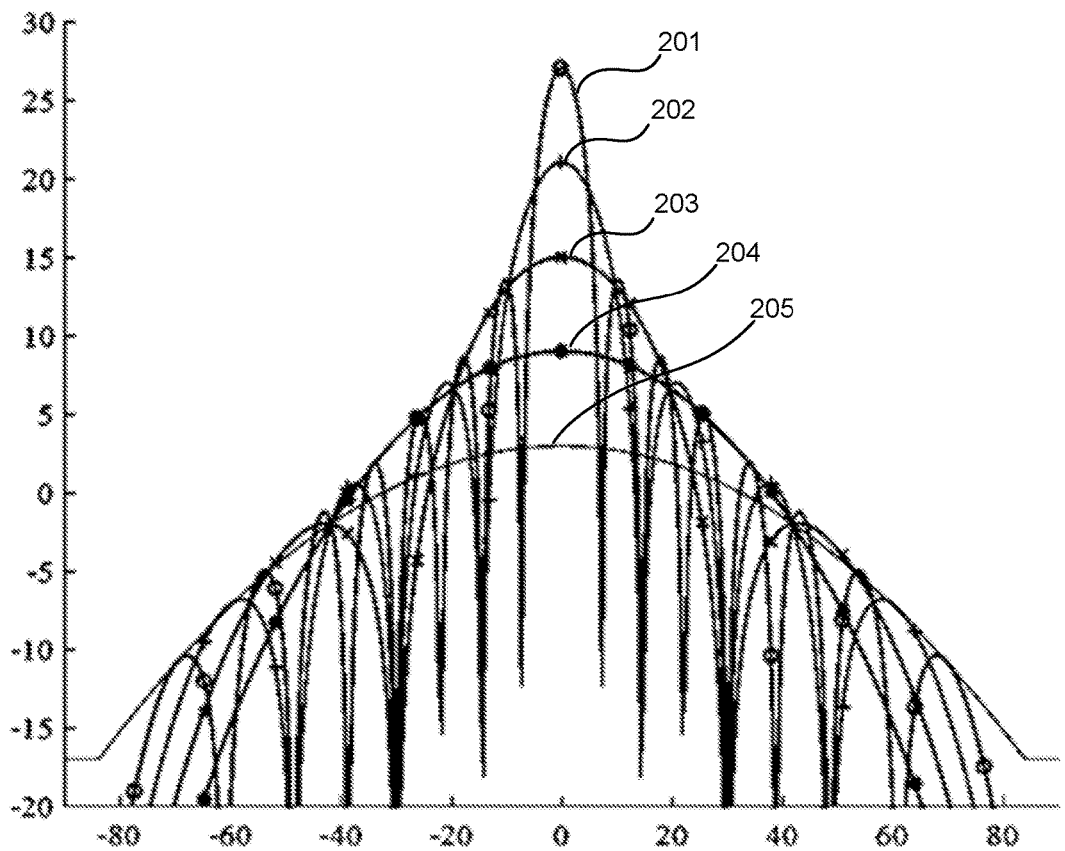
FIGS. 2a and 2b are plots illustrating example beam widths according to some embodiments.
Figure 2B:
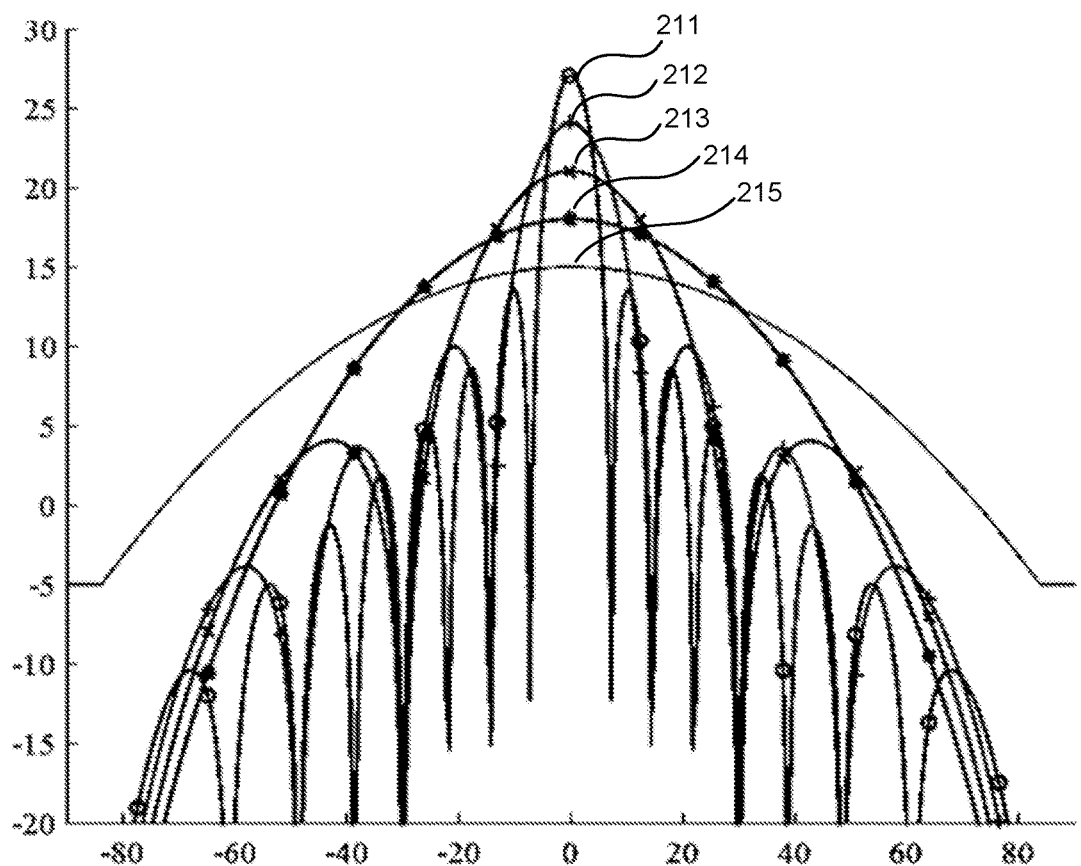

FIGS. 2*a* and 2*b* present two sets of such beam designs for the normal antenna direction, each set of beams having beams with successively narrower width and with successively farther reach. The x-axis indicates the azimuth angle in degrees and the y-axis indicates power radiation pattern in dB.

FIG. 2*a* presents a trivial solution to provide such a set by using antenna selection, i.e. by muting subsets of the available antenna elements. This approach yields successively larger beam widths when successively more antenna elements are muted at the cost of successively significantly lower output power, and thereby coverage (see the set of successively larger beam widths of beams 201 (16 sub-elements)-202 (8 sub-elements)-203 (4 sub-elements)-204 (2 sub-elements)-205 (1 sub-element) in FIG. 2*a*).

FIG. 2*b* presents a more power efficient solution to provide such a set by using the approach of WO 2016/141961 A1. This approach yields successively larger beam widths at less or no cost of successively lower output power (see the succession of larger beam widths of beams 211-212-213-214-215 in FIG. 2*b*). This approach involves an expansion of a subarray into the full array. The method is shown in FIG. 2*b* for subarray sizes of 1, 2, 4, 8 and 16 with an expansion factor of 2, but the same expansion technique can be applied to other subarray sizes and/or other expansion factors (e.g. 3 or 5). It is also possible to combine different expansion factors iteratively.

The following iterative procedure exemplifies the beam construction technique associated with the resulting beams of FIG. 2*b*:

Determine an initial weight set for a desired synchronization signal beam width: For an array with N subelements determine the desired number of subelements M that yields an FFT (or DFT) beam with a required beam width for good coverage (picked from the set $M \in \{2^t\}|_{t=1}^{log_2 N}$).

Perform array expansion: for $t = log_2 M, \ldots, log_2 N - 1$ compute beam forming weights for the given pair of orthogonal polarizations (A, B) according to $$w_A^{(t+1)} = \begin{bmatrix} w_A^{(t)} \\ -\widetilde{w}_B^{(t)*} \end{bmatrix}, w_B^{(t+1)} = \begin{bmatrix} w_B^{(t)} \\ \widetilde{w}_A^{(t)*} \end{bmatrix},$$

where $\widetilde{w}^*$ denotes complex conjugate and reversing the order of the elements of the vector.

The resulting radiation pattern of the full N-subelement array will mimic the FFT (or DFT) beam of a subarray with M sub-elements generated by initial weights $w_A^{(log_2 M)}$ and $w_B^{(log_2 M)}$ in terms of beam width, but with a better coverage, i.e. a higher effective power since all N power amplifiers are used (compare FIGS. 2a and 2b).

The illustration in FIG. 2b and the example above is given for one dimension. It should be noted that this procedure can also be generalized to more dimensions, e.g. to two-dimensional planar antenna arrays, in which case the power leverage becomes even more prominent.

It is worth noting that application of WO 2016/141961 A1 typically maintains the optimality criterion of FFT/DFT beam forming in the sense that each expansion (i.e. the result of each iteration) is only a conjugated and reversed copy of another subset. However, the expansion yields a positive combining of antenna element outputs such that the total output power is doubled for each iteration according to the example above. In more general terms, the power gain over antenna element selection for an array of size (M×N) is $$10 \log_{10}\left(\frac{mn}{MN}\right)$$

where m and n are the numbers of elements used per dimension in case of element selection.

In the context of the calculation in step 120, starting with an initial set of beam forming weights resulting in a beam having the desired beam width according to the conventional DFT/FFT precoding, another set of beam forming weights also resulting in a beam having the desired beam width but with a larger number of non-zero weight values is obtained by performing an appropriate number of expansion stages (iterations). Each iteration may typically double the number of non-zero weight values according to some embodiments. In other embodiments, each iteration may expand the resulting number of non-zero weight values by another factor than two.

The approach to use an iterative algorithm is just one way of doing the array expansion (increasing the number of non-zero weights). Another approach is to calculate the weights associated with a (desired) array expansion in a single step. For example, starting from one aperture (the number of weights) which gives the desired beam width, it is possible to convert to the desired, larger, aperture in one step. Thus, calculating the beam forming weights in step 120 may comprise applying a one-step calculation algorithm (e.g. antenna-subcarrier decomposition as will be explained in the following).

Antenna Based Subcarrier Decomposition

Another way of designing wide beam is to partition the signal in the frequency domain. In the same manner as above, an initial weight set for a desired synchronization signal beam width may be determined via an FFT/DFT approach using M antenna elements, of in total N antenna elements.

If orthogonal frequency division multiplexing (OFDM) is applied, the sub-carriers for the synchronization signal may now be partitioned into N/M sets such that each set of sub-carriers is transmitted on a separate collection of M antenna elements. By transmitting fewer subcarriers in a set, each of the transmitted subcarriers of the set may be amplified accordingly (by a factor of approximately N/M) thereby resulting in a higher total output power.

Figure 3:
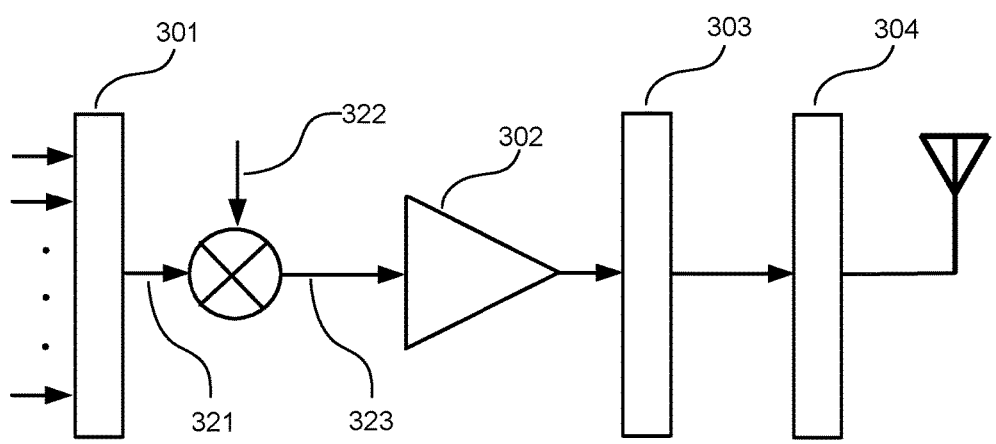
FIG. 3 is a schematic block diagram illustrating an example arrangement according to some embodiments.

FIG. 3 schematically illustrates a block scheme of antenna based subcarrier decomposition. The subcarriers are input to a serial-to-parallel converter 301 and the result 321 is subjected (e.g. by elementwise multiplication) to a discrimination and/or precoding matrix 322 with elements of zeros and ones, mapping the subcarriers to respective antenna(s). The discrimination matrix could typically be sparse such that the total number of K subcarriers mapped to antennas is low. This could, for example, be achieved by selecting every $(N/M)^{th}$ element of 321 for mapping to an antenna element, or by grouping adjacent subcarriers [1, . . . , (KM)/N] for mapping to an antenna element.

The result 323 of the discrimination is subjected to amplification as illustrated by the schematic amplifier 302 (applying an amplification factor of N/M which is possible due to the decreased number of subcarriers), and thereafter run through an inverse fast Fourier transform (IFFT) 303 and a parallel-to-serial converter 304 before transmission. It should be noted that there is typically not a single amplifier 302, but rather as many amplifiers as there are beams. In some embodiments, each segment of the discriminator output may be handled by a corresponding amplified, for example.

Thus, when applied to the embodiments herein, this approach comprises obtaining the desired synchronization signal beam width by selecting the number of antenna elements M per partitioned subset, whereby the beam widening factor compared to the conventional DFT/FFT precoding from the same array equals N/M.

When the synchronization signal is a synchronization signal block (SSB) including primary synchronization signals (PSS), secondary synchronization signals (SSS) and physical broadcast channel (PBCH) the following may be applicable. Due to the SSB composition, in particular the difference in the number of subcarriers that are being used for PSS and SSS (127 subcarriers) and for the PBCH (288 subcarriers), the selection of the subcarrier to antenna element mapping 302 may be important. Since the number of subcarriers differs between the four symbols of an SSB, it may be preferable to select every $(N/M)^{th}$ subcarrier to be mapped on the same antenna such that no antenna element will lack output signal for any symbols. Thereby, a further amplification for PSS and SSS is also possible, approximately by a factor of 288/127. In one embodiment, the grouping is performed considering reference signals such that reference signals are shared according to some distribution, e.g., evenly across subgroups. This may be particularly important for low correlation antenna configurations.

Antenna group selection may also be important due to channel estimation problems associated with splitting subcarriers over different channels. Hence, in some embodiments, antennas are grouped such that the total antenna correlation between different antenna ports is maximized.

Figure 4:
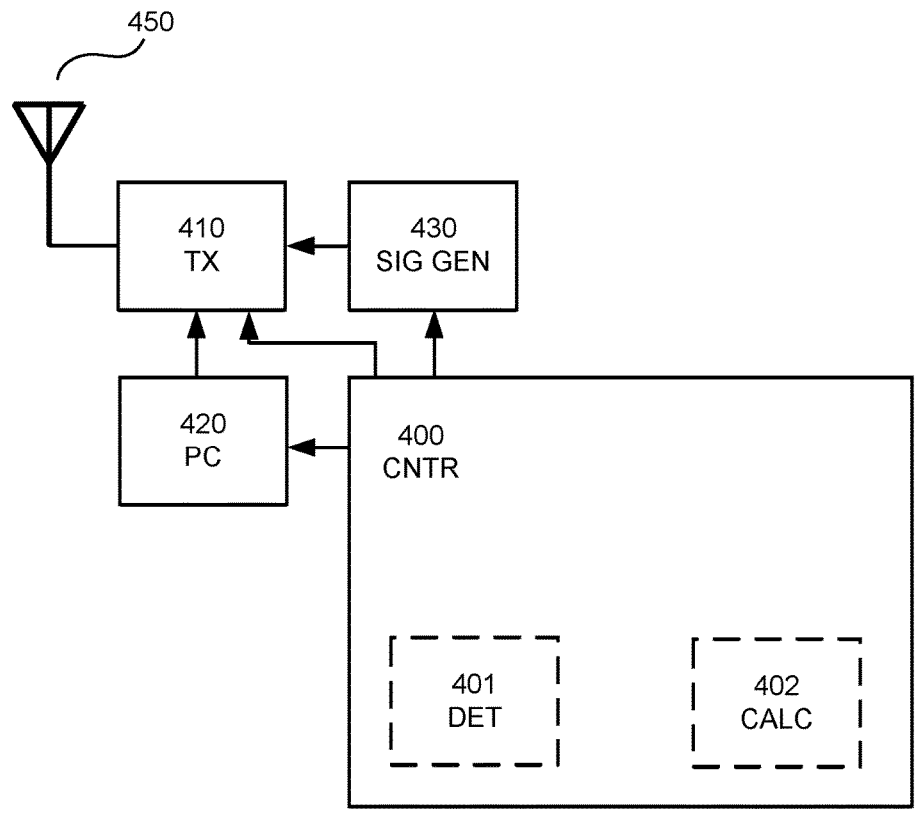
FIG. 4 is a schematic block diagram illustrating an example arrangement according to some embodiments.

FIG. 4 schematically illustrates an example arrangement according to some embodiments. In some embodiments, the example arrangement may be configured to cause execution of steps of the method of FIG. 1 or otherwise described herein.

The example arrangement may, for example, be for a network node configured to transmit wireless communication signals using beam forming and configured to apply any of one or more data carrying beam widths for transmission of data carrying signals dedicated to a specific wireless communication device. In some embodiments, the arrangement is comprised in a network node.

The arrangement comprises a controller (CNTR) 400 configured to cause determination of one or more requirement parameters for transmission of synchronization signals (compare with step 110 of FIG. 1). The determination may, for example, be performed by determination circuitry (e.g. a determiner, DET, 401) comprised in, or otherwise associated with, the controller 400.

In the same manner as described above, the one or more requirement parameters comprise at least a desired synchronization signal beam width and a minimum effective power, wherein the determined desired synchronization signal beam width is larger than a minimum one of the data carrying beam widths.

The controller 400 is also configured to cause calculation of beam forming weights based on the one or more requirement parameters (compare with step 120 of FIG. 1). The calculation may, for example, be performed by calculation circuitry (e.g. a calculator, CALC, 402) comprised in, or otherwise associated with, the controller 400.

In the same manner as described above, a beam resulting from the calculated beam forming weights has a beam width larger than, or equal to, the determined desired synchronization signal beam width and an effective power larger than, or equal to, the minimum effective power. The calculation is performed by assigning non-zero value to a number of beam forming weights which exceeds a minimum number of beam forming weights for the determined desired synchronization signal beam width.

The controller 400 is also configured to cause generation of a synchronization signal for transmission (compare with step 130 of FIG. 1). The signal generation may, for example, be performed by signal generation circuitry (e.g. a signal generator, SIG GEN, 430) comprised in, or otherwise associated with, the controller 400.

The controller 400 is also configured to cause transmission of the generated synchronization signal using the calculated beam forming weights (compare with step 140 of FIG. 1). The transmission may, for example, be performed by transmission circuitry (e.g. a transmitter, TX, 410 and an antenna collection 450) associated with the controller 400.

An advantage of some embodiments is that, compared to a solution where FFT/DFT beams are used that utilize all power amplifiers (i.e. all antenna elements) in the antenna array for sweeping synchronization signals over the coverage area, fewer beams (sweeping directions) need to be transmitted since the beams are wider. This implies less system signaling overhead and higher system capacity for data transmission. This may be particularly important in NR since the number of synchronization beams may be restricted, not allowing transmission of a broadcast signal using high output power on all antennas without the use of wide beams.

An advantage of some embodiments is that, compared to a solution where single elements or a small subset of antenna elements are used to transmit synchronization signals in wide beams, the maximum available transmission power is drastically increased due to invoking more power amplifiers. This implies that the synchronization signals may reach farther, increasing the cell coverage.

Some embodiments aim at using as large a part of the antenna array as possible (preferably the whole antenna array), i.e. having as many non-zero beam forming weight as possible, to provide for a maximization of the available power. Such embodiments are particularly applicable to digital antenna arrays with active power amplifiers.

Some embodiments may also be applicable to analog antennas with distributed or centralized power amplification and using, for example, phase rotators to create lobes (beams), which makes it possible to use larger analog antennas than otherwise. For example, a certain coverage angle and a maximum number of lobes may determine the maximum possible size of the antenna according to conventional approaches, while application of some embodiments enables use of a larger antenna since the size of the antenna is no longer equally dependent on the coverage angle and the number of lobes.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a network node.

Embodiments may appear within an electronic apparatus (such as a network node) comprising arrangements, circuitry, and/or logic according to any of the embodiments described herein. Alternatively or additionally, an electronic apparatus (such as a network node) may be configured to perform methods according to any of the embodiments described herein.

Figure 5:
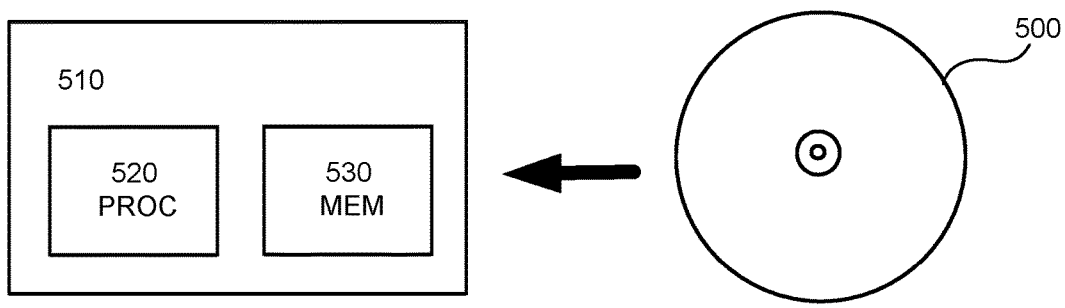
FIG. 5 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processor (PROC) 520, which may, for example, be comprised in a network node 510. When loaded into the data processing unit, the computer program may be stored in a memory (MEM) 530 associated with or comprised in the data-processing unit. According to some embodiments, the computer program may, when loaded into and run by the data processing unit, cause execution of method steps according to, for example, the method illustrated in FIG. 1 or otherwise described herein.

Reference has been made herein to various embodiments. However, a person skilled in the art would recognize numerous variations to the described embodiments that would still fall within the scope of the claims. For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Hence, it should be understood that the details of the described embodiments are merely examples brought forward for illustrative purposes, and that all variations that fall within the scope of the claims are intended to be embraced therein.

The invention claimed is:

1. A method for a network node configured to transmit wireless communication signals using beam forming and configured to apply any of one or more data carrying beam widths for transmission of data carrying signals dedicated to a specific wireless communication device, the method comprising:
   determining one or more requirement parameters for transmission of synchronization signals, wherein the one or more requirement parameters comprise a desired synchronization signal beam width and a minimum effective power, and wherein the determined desired synchronization signal beam width is larger than a minimum one of the data carrying beam widths;
   calculating beam forming weights based on the one or more requirement parameters by assigning non-zero values to a number of beam forming weights that exceeds a minimum number of beam forming weights for the determined desired synchronization signal beam width, wherein a beam resulting from the calculated beam forming weights has a beam width larger than or equal to the determined desired synchronization signal beam width, and an effective power larger than or equal to the minimum effective power;
   generating a synchronization signal for transmission; and
   transmitting the generated synchronization signal using the calculated beam forming weights.

2. The method of claim 1 wherein the determined desired synchronization signal beam width is smaller than an omni-directional beam width.

3. The method of claim 1 wherein the one or more requirement parameters further comprise one or more of: a beam direction and a beam polarization.

4. The method of claim 1 wherein determining the one or more requirement parameters is performed based on a required coverage for the synchronization signals.

5. The method of claim 1 wherein at least one of the minimum effective power and the minimum number of beam forming weights is associated with a discrete Fourier transform beam having the determined desired synchronization signal beam width.

6. The method of claim 5 wherein the minimum effective power is larger than an effective power achieved by constructing the discrete Fourier transform beam having the determined desired synchronization signal beam width.

7. The method of claim 5 wherein the minimum number of beam forming weights is larger than a number of non-zero beam forming weights achieved by constructing the discrete Fourier transform beam having the determined desired synchronization signal beam width.

8. The method of claim 5 wherein calculating the beam forming weights comprises applying an iterative algorithm using the discrete Fourier transform beam having the determined desired synchronization signal beam width as an input value, and wherein each iteration increases the number of non-zero beam forming weights.

9. The method of claim 1 wherein the one or more requirement parameters further comprise a number of beams to be swept, wherein the method further comprises:
   calculating beam forming weights for each of the beams to be swept;
   generating the synchronization signal by adapting, based on a sweeping pattern, the synchronization signal for the beams to be swept; and
   transmitting the adapted synchronization signal by sweeping the beams.

10. The method of claim 9 wherein sweeping the beams is performed in at least one of: a time dimension and a frequency dimension.

11. A non-transitory, computer readable medium storing program instructions that, when executed by a data processing unit, cause execution of the method of claim 1.

12. An arrangement for a network node configured to transmit wireless communication signals using beam forming and configured to apply any of one or more data carrying beam widths for transmission of data carrying signals dedicated to a specific wireless communication device, the arrangement comprising:
   at least one processor; and
   at least one memory storing executable program instructions that, when executed by the
   at least one processor, cause:
      determination of one or more requirement parameters for transmission of synchronization signals, wherein the one or more requirement parameters comprise a desired synchronization signal beam width and a minimum effective power, and wherein the determined desired synchronization signal beam width is larger than a minimum one of the data carrying beam widths;
      calculation of beam forming weights based on the one or more requirement parameters by assigning non-zero value to a number of beam forming weights that exceeds a minimum number of beam forming weights for the determined desired synchronization signal beam width, wherein a beam resulting from the calculated beam forming weights has a beam width larger than or equal to the determined desired synchronization signal beam width, and an effective power larger than or equal to the minimum effective power;
      generation of a synchronization signal for transmission; and
      transmission of the generated synchronization signal using the calculated beam forming weights.

13. The arrangement of claim 12 wherein at least one of the minimum effective power and the minimum number of beam forming weights is associated with a discrete Fourier transform beam having the determined desired synchronization signal beam width.

14. The arrangement of claim 13 wherein the executed program instructions further cause calculation of the beam forming weights by application of an iterative algorithm that uses the discrete Fourier transform beam having the determined desired synchronization signal beam width as an input value, wherein each iteration increases the number of non-zero beam forming weights.

15. The arrangement of claim 12 wherein the one or more requirement parameters further comprise a number of beams to be swept, and wherein the executed program instructions further cause:
   calculation of beam forming weights for each of the beams to be swept;

generation of the synchronization signal by adaptation, based on a sweeping pattern, of the synchronization signal for the beams to be swept; and transmission of the adapted synchronization signal by sweeping the beams.

16. A network node comprising the arrangement of claim 12.

* * * * *